| United States Patent [19] | | [11] | 4,124,504 |
|---|---|---|---|
| Munden | | [45] | Nov. 7, 1978 |

[54] PROCESS FOR TREATING CAUSTIC WASH SOLUTIONS

[76] Inventor: George Munden, 1024 W. Main, #61, Mesa, Ariz. 85201

[21] Appl. No.: 800,303

[22] Filed: May 25, 1977

[51] Int. Cl.$^2$ .............................................. C02B 1/20
[52] U.S. Cl. ........................................ 210/50; 134/13
[58] Field of Search ..................... 210/50, 63 R, 96 R, 210/42 R, 70, 71; 134/10, 13

[56] References Cited

U.S. PATENT DOCUMENTS

| 3,167,506 | 1/1965 | Fackler et al. .......................... 210/50 |
| 3,171,800 | 3/1965 | Rice et al. .............................. 210/50 |
| 3,568,834 | 3/1971 | Treat ...................................... 210/71 |
| 3,930,879 | 1/1976 | Erickson et al. ....................... 134/10 |

Primary Examiner—Charles N. Hart
Assistant Examiner—Benoit Castel
Attorney, Agent, or Firm—Wilkinson, Mawhinney & Theibault

[57] ABSTRACT

A process is disclosed for treating caustic wash solutions with permanganate ions such that a significant degree of chemical purification of the wash solutions is effected which correspondingly permits reuse of the wash solutions in cleaning metal articles.

4 Claims, No Drawings

PROCESS FOR TREATING CAUSTIC WASH SOLUTIONS

FIELD OF THE INVENTION

The present invention relates to a process for treating contaminated caustic wash solutions with permanganate ions to effect a significant degree of chemical purification which permits reuse of the wash solutions in cleaning metal articles.

BACKGROUND OF THE INVENTION

Numerous attempts have been made in the prior art to regenerate caustic wash solutions contaminated with dirt accumulations following the cleaning of metal articles. Typically, the contaminants comprise a wide range of materials including particulate matter, oils, greases, inorganic salts, and metal residues which makes regeneration extremely difficult, costly and time consuming.

Because of the difficulty in regenerating caustic wash solutions, and the limited success of prior art attempts, caustic wash solutions have been used to clean metal articles until a heavy dirt load accumulates at which time the wash solutions are discarded.

Filtration techniques have been attempted to regenerate caustic wash solutions, also with limited success. The results of attempts at using filtration techniques have been either the limited removal of contaminants when coarse filters are used or alternatively where fine filters are used the filters are found to plug or require an extremely long period of time to effect filtration. One example of a filtering system for caustic wash solutions is that disclosed in U.S. Pat. No. 3,568,834, which requires filtering cycles of 1 to 5 days.

Another prior art attempt to effect removal of contaminants from wash solutions is that disclosed in U.S. Pat. No. 3,802,917 wherein a small amount of high molecular weight, water-soluble anionic polymer is employed to coalesce tramp oils which then float to the surface from which they are readily separated. One difficulty with the use of these polymers is that the contaminants other than tramp oils remain and build-up in the wash solution. Again, only limited success is achieved in removing contaminants from caustic wash solutions.

Because of the difficulty in removing the contaminants from caustic wash solutions, the prior art has resorted to developing highly involved systems. One such system is that disclosed in U.S. Pat. No. 3,930,879 wherein a portion of the wash water is recirculated to a processing stage where oil and scale are separated continuously. One difficulty which such systems encounter is that they are highly specialized and expensive thereby having limited commercial appeal to processers seeking simple, highly efficient ways to effect removal of contaminants from caustic wash solutions.

Conventionally, in preparing a caustic wash solution, a 50% weight of aqueous caustic solution received from conventional suppliers is diluted to approximately 16 to 18% by weight and is employed to wash metal articles under heat and pressure. During prolonged washing operation, the wash solution is altered in chemical composition corresponding to a gradual increase in contaminants both organic and inorganic in nature.

After prolonged usage of the caustic wash solution in cleaning metal articles, a point of saturation is reached of both organic and inorganic contaminants. Because heat is employed in the cleaning cycle there is a tendency for the wash solution to become supersaturated. Upon cooling the wash solution to ambient temperature, there is a tendency for an increment of contaminants to separate out of the wash solution, the increment corresponding to the temperature differential. This is evident from a layering of the cooled solution with suspended solids and heavier contaminants sinking to the bottom of the vessel and the ligher oils floating on the surface of the wash solution. However, this is not an indication that the caustic wash solution is self-cleaning since the amount of contaminants which separate out as a result of cooling is very small in relation to the total amount of dissolved contaminants in the wash solution.

As the point of saturation is approached for the ontaminants, the wash solution rapidly loses cleaning efficiency such that in order to maintain an adequate degree of cleaning, additional caustic must be added to the wash solution. The additional caustic while increasing the total caustic concentration of the wash solution does not correspondingly increase the cleaning efficiency of the wash solution by any degree which corresponds to the added increment. This is due primarily to the counter effect of the contaminants already present in the wash solution which convert the caustic to a chemical state much less efficient than uncontaminated caustic.

It is also found that after a number of cycles of cooling to ambient temperature following washing of metal articles; layering-removal of contaminants from the wash solution results in less of an increment of contaminants being removed due to supersaturation and repeated additions of make-up caustic. And by addition of make-up caustic, the total caustic strength increases to a point somewhere between about 25 to 30% by weight.

Although the use of cycle treatment and layering removal prolongs the life of the caustic wash solution over an extended period of time, eventually continued addditions of make-up caustic are not justified since they do not correspond to the added expense of the additional dosage. Thus, as the cycles are repeated and the total caustic strength gradually increases, the amount of contaminants removed following cooling gradually decreases. Eventually, a point is reached where the amount of contaminants which are removed is insignificant and the total amount of the caustic wash solution must be replaced.

Certain chemical compounds can be added to the wash solution to increase its efficiency and possibly prolong the useful life. For example, surface active agents may be added which tend to reduce surface tension and hence increase penetrating capacity of the wash solution, while promoting the removal of contaminants by increasing the emulsion properties of the wash solution. These chemical additives are expensive and because they are typically organic compounds, they are subject to being decomposed. Thus, although surface active agents increase the efficiency of the wash solution over a short period of time, their usage in the long run eventually adds to the total amount of organic contaminants in the wash solution.

If the concept of cleaning metal articles is predicated on the eventual disposal of the caustic solution, then there must be some justification for the additional expense of the surface active agents. If, however, the concept of cleaning metal articles is predicated on regeneration of the wash solution, then there is little justification to use surface active agents because of the expense and the fact that they contribute to the contamination problem over the long run.

A number of chemical changes are also found to take place in the wash solution. The caustic which is used to prepare the wash solution contains essentially no sodium carbonate. However, during cleaning, sodium carbonate rapidly builds up in concentration. Although sodium carbonate is sometimes used as an alternative to sodium hydroxide as a cleaning medium, its presence may not be detrimental to the efficiency of the caustic wash solution.

Build-up of sodium carbonate appears to be caused partly by aeration of the wash solution but more likely is caused by the decomposition of organic contaminants under heat and pressure. Decomposition of the organic contaminants releases carbon dioxide which in turn forms the carbonate radicle. This change occurs at the expense of the sodium hydroxide concentration so that almost any sample of the wash solution will show an approximately equal distribution between the sodium hydroxide concentration and that of sodium carbonate.

Inorganic contaminants may account for about 5 to 7% by weight of the total contaminants in a caustic wash solution. These contaminants include phosphate, arsenic, lead, cadmium and other heavy metals which represent a problem in disposal of the contaminated caustic wash solution. Many of these contaminants are actively poisonous and thus require strict disposal requirements.

It has now been found that by practice of the present invention, the difficulties and disadvantages of prior art attempts to remove contaminants from caustic wash solutions have been overcome in a simple, highly efficient manner.

SUMMARY OF THE INVENTION

The present invention, generally stated, relates to a process for removing contaminants from caustic wash solutions by means of permanganate ions.

It is an object of this invention to treat contaminated alkaline wash solution and permit reuse thereof while eliminating disposal problems and adverse ecological and environmental effects.

It is also an object of this invention to regenerate caustic wash solutions in an efficient, relatively inexpensive manner by means of chemical purification using permanganate ions.

It is another object of this invention to process caustic wash solutions using permanganate ions which effectively remove contaminants from caustic wash solutions without introduction of contaminants from the permanganate additive.

These objects as well as additional objects and advantages will become more apparent from the following more detailed description of the preferred embodiments.

DETAILED DESCRIPTION OF THE PREFERRED EMBODIMENTS

Practice of the present process provides an effective means by which to remove contaminants from a caustic wash solution. The contaminants can be classified conveniently into three broad categories, e.g. saturates, olefins, and aromatics, which represent about 25 to 30% by weight of the total contamination of the caustic wash solution. The saturates include for example, waxes, tar, heavy to medium greases, and the like. The olefins include for example, medium to light greases, heavier oils, and the like. The aromatics include heavier to light oils, volatile residues which are not evaporated from the heated wash solution, and the like. The chemical distinction between these three categories of contaminants lies in the number of double bonds associated with the molecular structure of the aromatics and olefins or the total absence of the double bonds in the saturates.

The efficiency of the caustic wash solution is associated with the ability to form an emulsion and to retain the contaminants suspended therein. This efficiency occurs at the expense of the hydroxyl ions (OH—) in the caustic wash solution. The hydroxyl ions tend to encapsulate the positively charged organic molecules thus giving the molecules a net negative charge such that they repel one another and thus remain suspended in the wash solution. Thus, although there is no chemical change insofar as the organic residues are concerned, there is a physical adsorption of the charged particles on the surface of the relatively large organic molecules which is occasioned by galvanic forces of opposite charges. Much of the same physical reaction occurs with the positively charged metal ions.

Salt ions remain in solution by reason of the concentration and temperature conditions. When the volume of the solution is lowered or when the critical temperature is reached, crystals of semi-pure sodium carbonate tend to precipitate out of the wash solution.

As the total concentration of sodium carbonate increases, the amount of available hydroxyl ions decreases with a corresponding decrease in the cleaning efficiency of the wash solution. At the saturation point, essentially all of the available hydroxyl ions become trapped and in addition, considerable quantities of dissolved carbon dioxide also is present. If at this point, make-up caustic is added, a large proportion converts to carbonate leaving only a fractional amount available to emulsify whatever organic and heavy metal residues which may be dissolved in the wash solution. Thus, any anticipated improvement in cleaning efficiency is comprised at the outset and further additions of make-up caustic become necessary.

After carefully considering the chemical changes which occur in caustic wash solutions, attempts were made to find new and simplified methods for chemical purification of caustic wash solutions.

Thus, in the effort to uncover new methods for chemical purification of caustic wash solutions, it was found that when certain quantities of permanganate ions are added to contaminated caustic wash solutions, preferably to a cold solution, significant lowering of both organic and inorganic contaminants is found to result.

A unique feature of the reactions which occur when permanganate is added to contaminated caustic wash solution is that a chemical reduction to manganese dioxide ($MnO_2$) is found to result as opposed to a reduction to manganous ion ($Mn^{+2}$) and water. Reduction to the middle stage of manganese dioxide provides a compound capable of forming a floc which precipitates out of solution. Thus, once the reaction between permanganate and organic contaminants has been effected, the permanganate is released from the solution in the form of a flocculent precipitate of manganese dioxide which avoids addition of a contaminant during chemical purification.

Although not intending to be bound by the theory of how chemical purification is effected by practice of the present invention, it appears that the permanganate oxidizes the organic contaminants of the caustic wash solution, generally attacking at a double bond junction. This then effects reduction of the organic compounds to tar residues which tend to adhere onto the surface of the manganese dioxide and improve the flocing efficiency.

Another characteristic of precipitation of the manganese dioxide is that it initiates co-precipitation. Thus, charged ions in the wash solution adhere to the surface of the floc and are removed from the solution as a precipitate. It has been surprisingly found that this phenomenon tends to occur to a much greater extent at some concentrations of permanganate than at others. It is speculated that this is due to the physical size of the floc formed around the manganese dioxide.

The amount of permanganate added to the caustic wash solution may vary and when calculated as potassium permanganate ranges from about 0.2 part by weight to about 5 parts by weight potassium permanganate per 100 parts by weight of contaminated caustic wash solution. Little additional effectiveness appears to be achieved when additions exceed about 5 parts by weight potassium permanganate, calculated basis, per 100 parts wash solution. Preferably, the amount of permanganate varies from about 0.5 part to about 2.0 parts $KMnO_4$ per 100 parts contaminated caustic wash solution. Maximum precipitation of heavy metals is achieved from the contaminated caustic wash solution when about 1.5 parts $KMnO_4$ are added per 100 parts contaminated caustic wash solution.

Precipitation of contaminants by means of permanganate appears also to be dependent on the amount of organic material which is present. At various levels of organic contaminants, a given amount of permanganate can effectively remove from about 30 to about 70% by weight of the contaminants. Thus, if maximum results are to be achieved by practice of the present invention, the optimum dosage of permanganate should be initially determined by the procedure defined subsequently.

Once the optimum amount of permanganate to be added is determined by the samples, it is a simple calculation to determine the dosage to be added to the bulk contaminated caustic wash solution.

It will be noted that at the optimum concentration of permanganate, the total caustic strength is negligibly lower than the original or untreated sample. These results become possible because of the increase of sodium hydroxide concentration at the expense of the sodium carbonate concentration. This represents a slight reversal of the normal contamination sequence and it appears that this characteristic is due to the rate at which the permanganate reduces the organic matter. At the optimum concentration the rate of reaction is sufficiently reduced to minimize the production of carbon dioxide which in turn least affects the $NaOH/Na_2CO_3$ ratio. At some contamination levels the concentration of permanganate is too high, the resulting floc will not yield a maximum result of purification. This is also the result when the concentration of permanganate is too low.

The effect of co-precipitation tends to remove most of the heavy metal ions as well as the phosphate and arsenic ions from the wash solution.

The permanganate which may be added to effect chemical purification of the caustic wash solution is, potassium permanganate.

Alkaline salts which may be used in wash solutions include sodium orthosilicate, sodium metasilicate, trisodium phosphate, sodium metaborate, sodium carbonate, tetrasodium pyrophosphate, sodium tetraborate and sodium polyphosphate used separately or in various combinations. Sodium hydroxide is preferred.

Surface active agents may be added optionally to the caustic wash solution to further improve the cleaning effect. Generally, these materials are either anionic or nonionic compounds and are well known to the art.

In normal cleaning of metal articles, the caustic wash solution is normally maintained under heat and pressure. When the caustic wash solution has cooled to ambient temperature and layering has occured, it is important to remove all residues of lighter oils on the surface and the heavier residues in the bottom of the tank by any suitable means such as flushing into pits provided for this purpose.

After the permanganate has been added to the decanted solution, agitation is desirable by any convenient means including mixing blades, air, or the like.

The use of permanganate to treat caustic wash solutions has been described. It is noted that the permanganate ions can effectively remove contaminants from solutions which are strongly basic, neutral or mildly acidic in character. Thus, the permanganate is useful for chemical purification of solutions having a pH of about 4 to about 14 where pH is a viable parameter. And by frequent rotation of the contaminated wash solution, it is possible to reduce the amount of permanganate which is used to a minimum.

Treatment of contaminated alkaline wash solution using practice of the present invention substantially reduces the proportion of contaminants carried by the solution.

The following examples illustrate practice of the present invention in greater detail. In the examples, as well as in the specification generally, all parts are given by weight unless indicated otherwise.

EXAMPLE 1

The concentration of the contaminants of a batch of caustic wash solution is determined by taking five samples of 100 parts of contaminated caustic wash solution and adding to four samples increments of 0.5 part of permanganate calculated as $KMnO_4$. The fifth sample serves as a control and remains untreated. After thoroughly mixing the treated samples, they are filtered through Whatman No. 42 filter paper and three 10 ml. aliquots each of the resulting filtrate are titrated with 1 N.hydrochloric acid. The control sample is similarily processed from the step of filtration. Then, by using phenolphthalein and methyl orange titration techniques, it is possible to determine the $NaOH/Na_2CO_3$ concentrations.

By arranging the sample titration results in descending order beginning with the control sample and ending with the highest $KMnO_4$ dosage, it will be seen that one concentration of the permanganate will nearly approach the original concentration of the control sample. It is this value of permanganate which approaches the control that represents the optimum dosage level.

Taking the amount of the sample, it is a simple matter to calculate the quantity of permanganate needed to dose 12,000 gallons in pounds per gallon.

EXAMPLE 2

A batch of 12,000 gallons of caustic wash solution is pumped into an 18,000 gallon tank. It is allowed to settle overnight and the heavier suspended solids are flushed from the tank bottom while the lighter oils are skimmed from the surface. After this has been accomplished five samples of 100 parts were taken and processed according to the procedure of Example 1. It is thus determined that the amount of permanganate to be added is 1.5 parts KMnO$_4$ per 100 parts contaminated caustic wash water. From this determination, it is found that about 600 pounds of potassium permanganate represents an optimum amount to be added to the 12,000 gallons of contaminated caustic wash water.

After the potassium permanganate has been added, the contaminated caustic wash solution was agitated using compressed air for one hour and the solution was allowed to settle overnight by gravity. The bottom sludge layer is flushed from the tank and the remaining solution was recycled for cleaning metal articles. Tests on the recycled solution will indicate removal of contaminants of about 65%.

EXAMPLE 3

The procedure of Example 2 was repeated except using samples taken from a contaminated 14,000 gallon batch of caustic wash solution which was settled overnight and after the heavier and lighter residues were removed. Following the procedure of Example 1, it was determined that the amount of permanganate to be added is about 885 pounds of potassium permanganate which represents an optimum amount to be added to the 14,000 gallons of contaminated caustic wash water.

After the potassium permanganate has been added, the contaminated caustic wash solution was agitated using compressed air for one hour and the solution was allowed to settle overnight by gravity. The bottom sludge layer is flushed from the tank and the remaining solution was recycled for cleaning metal articles. Tests on the recycled solution will indicate removal of contaminants of about 75%.

EXAMPLE 4

The caustic wash solution processed in Example 3 was reprocessed using the procedure of Example 2 after thirty days cleaning of fouled metal articles. It is found that less permanganate is required to effect cleaning of about 70% and there is no significant loss of caustic effectiveness.

Since by practice of the present invention, contaminated caustic wash solutions can be purified and it becomes possible to use and reuse the caustic wash solutions over again. Also, with small additions of raw caustic and/or water to control the optimum cleaning concentration, it is possible to recycle the cleaned caustic solution back into the cleaning process and easily dry the withdrawn sludge to an ash for easy transfer and removal.

It is also evident that with frequent rotation of the contaminated wash solutions and processing by the present method, less contaminants will be present and will require a smaller relative amount of permanganate.

Using practice of the present invention, it is possible to remove practically all organic and non-organic contaminants by careful re-adjustment of the permanganate concentration for each treatment without a significant reduction of the caustic strength.

Practice of the present invention reduces the contaminants in alkaline wash solution and it is believed that the useful life of such solutions may be extended nearly indefinitely.

From the foregoing, it will be readily apparent to those skilled in the art that various modifications and changes may be effected without departing from practice of the presently disclosed invention.

What is claimed is:

1. A method for chemical purification of contaminated caustic wash solution which comprises,
    (a) removing any layered contaminants from the wash solution;
    (b) adding potassium permanganate to the contaminated wash solution in an amount ranging from about 0.2 parts to about 5 parts permanganate per 100 parts wash solution;
    (c) allowing precipitated contaminants to settle; and
    (d) separating precipitated contaminants from the wash solution.

2. The method of claim 1 wherein the amount ranges from about 0.5 parts to about 2 parts permanganate per 100 parts wash solution.

3. The method of claim 1 wherein about 30 to about 70% of the contaminants are separated from the wash solution.

4. The method of claim 1 wherein the optimum amount of potassium permanganate is determined by sample prior to addition of the permanganate to the contaminated wash solution.

* * * * *